(12) United States Patent
Ebrahimi

(10) Patent No.: US 6,424,743 B1
(45) Date of Patent: Jul. 23, 2002

(54) GRAPHICAL HANDWRITING RECOGNITION USER INTERFACE

(75) Inventor: Ali Ebrahimi, Palo Alto, CA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/434,927

(22) Filed: Nov. 5, 1999

(51) Int. Cl.[7] ............................................... G06K 9/00
(52) U.S. Cl. ........................................ 382/189; 382/179
(58) Field of Search ................................. 382/189, 190, 382/193, 188, 187, 191, 197, 200, 278, 179, 177, 180, 182, 184, 185; 345/1, 173; 355/244, 202, 209, 210

(56) References Cited

U.S. PATENT DOCUMENTS

| | | | | |
|---|---|---|---|---|
| 4,419,661 A | * | 12/1983 | Hetsugi ........................... | 345/1 |
| 5,257,074 A | * | 10/1993 | Kamei ........................... | 355/244 |
| 5,365,598 A | * | 11/1994 | Sklarew ........................... | 382/189 |
| 5,619,596 A | * | 4/1997 | Iwaki et al. ................... | 382/278 |
| 5,903,666 A | * | 5/1999 | Guzik et al. ................... | 382/179 |
| 6,008,799 A | * | 12/1999 | Van Kleeck ................... | 345/173 |

* cited by examiner

Primary Examiner—Andrew W. Johns
Assistant Examiner—Seyed Azarian
(74) Attorney, Agent, or Firm—Hisashi D. Watanabe

(57) ABSTRACT

A graphical handwriting recognition user interface includes a display, one or more areas designated on said display for enabling entry of handwritten information using a stylus, and an image of a character being displayed within the one or more areas designated for entering the handwritten information, the image depicting a form of the handwritten information to be entered. The image of the character is displayed for a predetermined period of time. The image of the character is displayed on the display using a low contrast ratio, and is displayed on the display in a manner depicting the character being entered, thereby rendering animation to the image of the character being displayed.

19 Claims, 7 Drawing Sheets

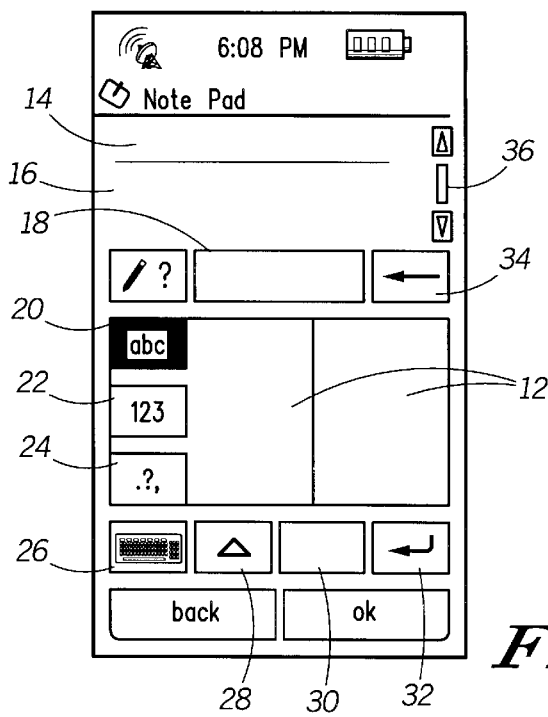
FIG. 1 PRIOR ART
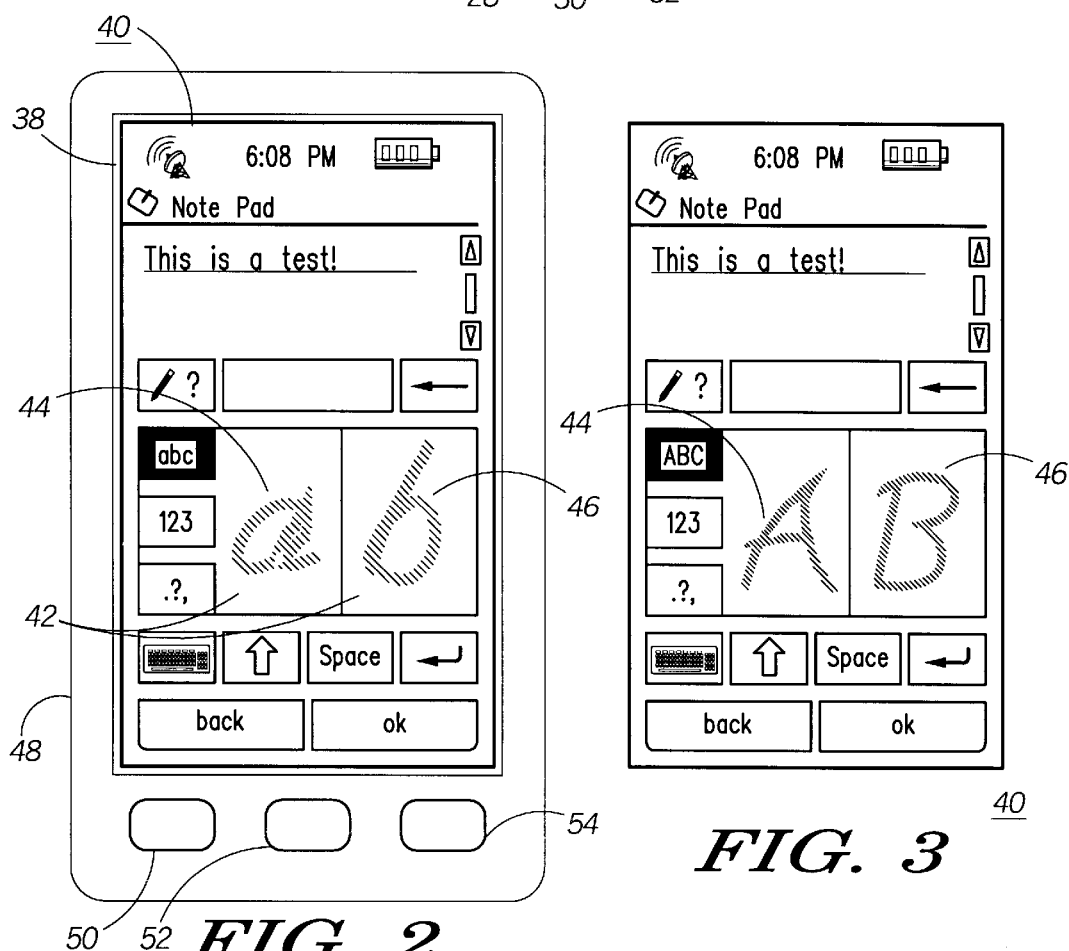
FIG. 2
FIG. 3

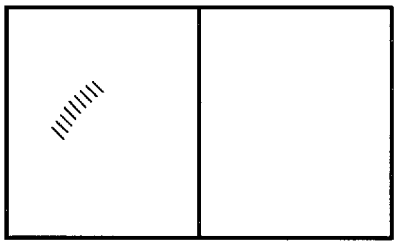 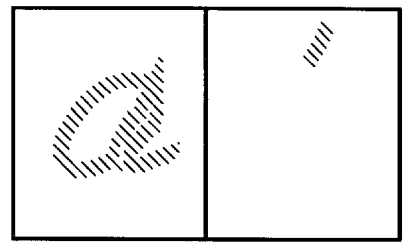
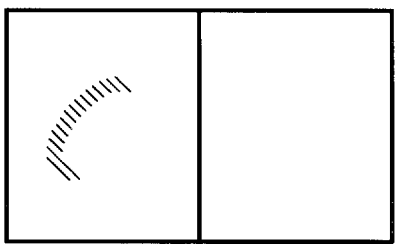 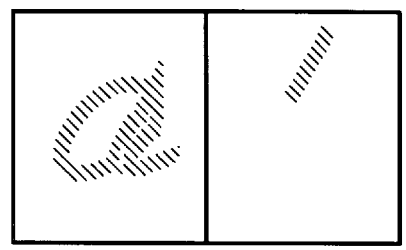
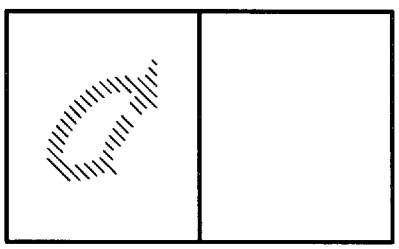 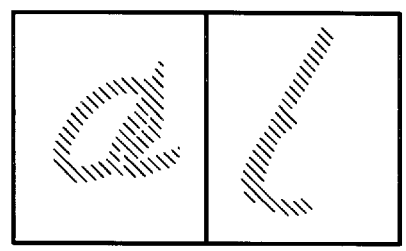
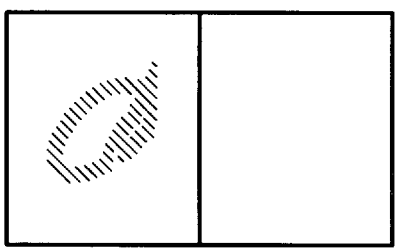 
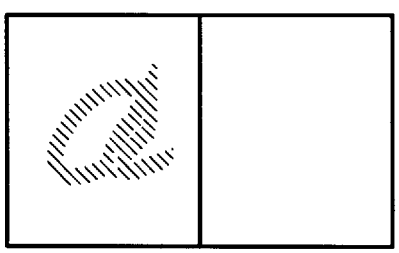 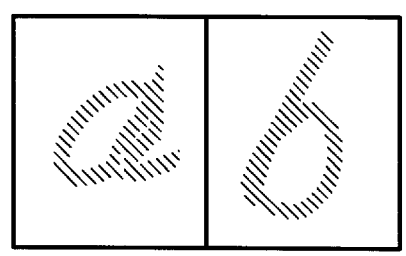
*FIG. 7*  *FIG. 8* ered. In addition, the prior art handwriting recognition

GRAPHICAL HANDWRITING RECOGNITION USER INTERFACE

BACKGROUND OF THE INVENTION

In the past, when users used a handwriting recognition program which provided a graphical user interface, an initial usability issue that was most apparent for the beginning users was that the users could not find the area in which they were supposed to hand-write (print) letters. In other words, the designated writing boxes, when provided by the handwriting recognition program user interface (UI) design, did not imply to the users the intended functionality. One of the most common problems associated with prior art graphical user interfaces was that the users tried writing more than one letter in each writing box, and as a result, the input was not recognized. In addition, the prior art handwriting recognition programs often required users to select a writing mode before entering letters, numbers, or symbols. Therefore, the users of such handwriting recognition software had to first select a tab corresponding to the writing mode desired ahead of time. At times users tended to forget to change the tabs before writing, and as an example, they wrote letters when the mode was set for symbols causing the system to miss-recognizes their input. Finally, users normally did not realize that the larger their handwriting, the better the handwriting recognition program would recognize the input. Many users also often wrote very small letters in the boxes, which decreased the accuracy of the system.

Thus, there is a need for a method and apparatus that would help the users understand the functionality of the handwriting recognition graphical user interface, and in particular, the behavior of the writing boxes when provided.

DESCRIPTION OF THE DRAWINGS

The features of the invention which are believed to be novel are set forth with particularity in the appended claims. The invention may be best understood by reference to the following description when taken in conjunction with the accompanying drawings, in the several figures of which like reference numerals identify identical elements, in which, and wherein:

FIG. 1 is a diagram of a prior art handwriting recognition graphical user interface.

FIGS. 2 through 5 are diagrams illustrating a handwriting recognition graphical user interface in accordance with the present invention.

FIGS. 7 and 8 is a diagram illustrating a character animation process in accordance with the present invention.

DETAILED DESCRIPTION OF THE INVENTION

Figures 4, 5:
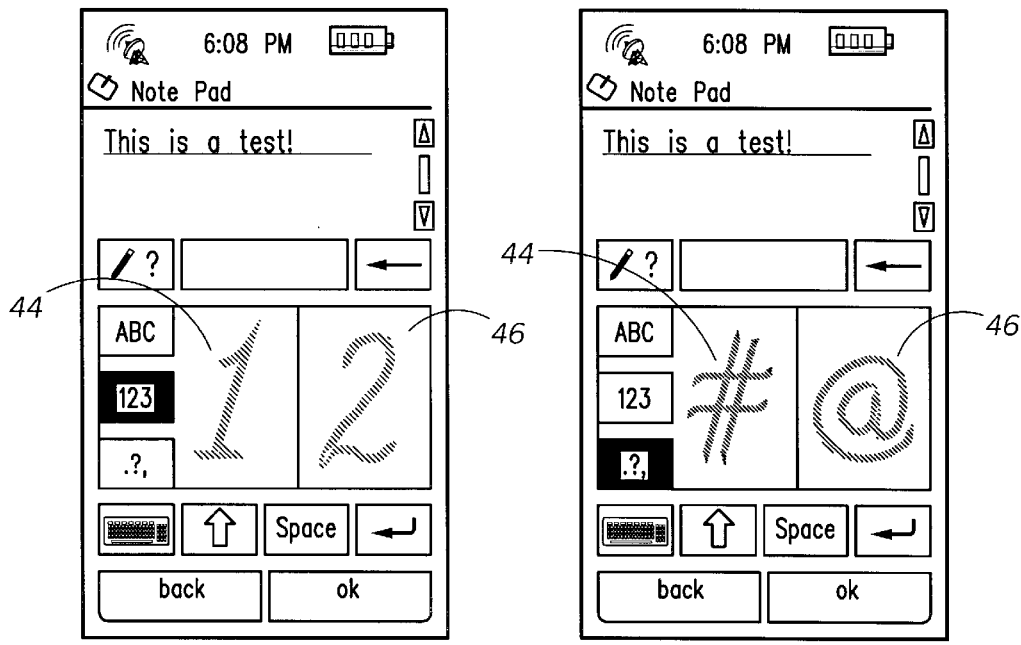

FIG. 1 is a diagram of a prior art handwriting recognition graphical user interface, or GUI 10 which is displayed on a display, such as an liquid crystal (LCD) display, and which is operable with a tactile entry tablet which utilizes a stylus. The GUI 10 utilizes a number of writing boxes 12, of which two are shown by way of example. The writing boxes 12 are areas where characters are written so that a handwriting recognition application, such as "QuickPrint", a product of the Lexicus Division of Motorola, Inc. of Schaumburg, Ill., can recognize the characters as they are inputted. A stylus, not shown, is used to print a letter, as one would print the letter on paper with a pencil or pen. When two handwriting boxes are provided as shown, the handwriting boxes allow the user to immediately begin printing the next character in the second of the handwriting boxes, or wait for the handwriting recognition application to recognize the printing in the current handwriting box, and then clear the current handwriting box. The recognized character is placed at a cursor insertion point 14 in a text window 16.

A results bar 18 displays other possible character choices in case the handwriting recognition software does not recognize the handwritten character. In the example provided in FIG. 1, the leftmost character is the top choice, which is displayed in capitalized form, and the subsequent characters are other possible recognition choices for the character printed. The proper character, if other than the top choice, is selected by tapping on any of the characters in the results bar 18 to replace that character for the top choice in the text window 16.

A write letters button 20 is selected when the user wishes to write alpha characters. When the write letters button 20 is selected, the handwriting recognition program expects only lower case letters to be written in the writing boxes 16. When upper case letters were to be written a shift button 28 was selected to change the format of the handwriting recognition software.

A write numbers button 22 is selected when the user wishes to write numeric characters. When the write numbers button 22 is selected, the handwriting recognition program expects only numbers to be written in the writing boxes 16.

A write punctuation button 24 is selected when the user wishes to add punctuation to the text. When the write punctuation button 24 is selected, the handwriting recognition program expects only punctuation and some numerical symbols to be written in the writing boxes 16.

A keyboard button 26 reveals one of four onscreen keyboards based on the write button selected. For example, when the user is currently writing numeric characters and the user selects the keyboard button 26, a numeric keyboard will appear on screen. A small version of a standard QWERTY keyboard, a punctuation keyboard, or a special characters keyboard will also be displayed when the user selects the keyboard button 26, and the user is currently writing alphanumeric characters, punctuation, or special characters, respectively.

A shift button 28, a space button 30, a return button 32, and a backspace button 34 provide simple user input of these frequently used characters and operations. A scroll bar 36 allows scrolling through a message which is too large to be displayed in the text window 16.

The GUI 10 described above, enables a user to enter handwritten data using a stylus. When using the GUI 10 described above, the initial usability issue that has been most apparent for the beginning users, is that user can't find the area in which they are supposed to hand-write (print) letters. In other words, the designated writing boxes in the GUI 10's design do not imply to the users their intended functionality. One of the most common problems is that users try writing more than one letter in each writing box and as a result, the input is not recognized. In addition, the handwriting recognition application generating GUI 10 provides automatic capitalization of the first word of a sentence, and in other instances requires the users to select a writing mode before entering letters, numbers, or symbols and punctuation. Consequently, in some instances the users must know when a capital or lower case letter is expected and enter the appropriate character, whereas in other instances, the handwriting recognition application is unable to anticipate when the user wishes to capitalize one or more letters, include symbols or add punctuation. In those instances the users have to select the corresponding writing tab ahead of time. As a consequence, users tend forget to write the character in the proper upper or lower case form, or change the writing tabs before writing capital letters, symbols or punctuation causing the system to miss-recognize their input. Finally, users normally don't generally realize that the larger their handwriting, the better GUI 10 can recognize the input. The users often write very small letters in the boxes, which decreases the accuracy of the system.

The problems described above, of inputting the wrong type of data in a writing box, inputting too much data in a writing box, or writing too small in the writing box, are solved by the use of the handwriting recognition graphical user interface in accordance with the present invention. Referring to FIG. 2 is shown writing areas 42 designated on a display 38 of a hand held electronic device 48, such as a personal digital assistant, which enables entry of handwritten information using a stylus 70, shown in FIG. 9. Buttons 50, 52, and 54 are utilized to generally control the operation of the hand held electronic device 48, and to select among other things, the handwriting recognition application which when selected generates the handwriting recognition handwriting user interface 40 which is displayed on display 38.

The handwriting recognition handwriting user interface 40 also displays an image of a character 44, 46 within the writing areas 42 designated for entering the handwritten information. The image of a character 44, 46 is hereinafter referred to as a watermark. The graphical handwriting recognition user interface 40 preferably includes multiple buttons, similar to those shown and described in FIG. 1, which provide a selection of a an equivalent number of writing modes. The image of the character 44, 46 displayed depicts the form, or stroke, by which the handwritten information is entered for each of the plurality of writing modes to insure the handwritten characters will be properly recognized by the handwriting recognition application. The image of the character 44, 46 also alerts the user that the handwritten character should fill the writing areas 42.

Referring to FIG. 2, the image of a character 44, 46 depicts lower case alphanumeric characters "a", and "b" which are displayed and indicate that the lower case write letters mode has been selected, either automatically by default, or at the users request, and the characters are to be entered as lower case characters. Referring to FIG. 3, the image of a character 44, 46 depicts upper case alphanumeric characters "A", and "B" which are displayed and indicate that the upper case write letters mode has been selected, again either automatically by default, or at the users request, and the characters are to be entered as upper case characters. Referring to FIG. 4, the image of a character 44, 46 depicts numeric characters "1", and "2" which are displayed and indicates that the write numeric letters mode has been selected and the characters are to be entered as numeric characters. Referring to FIG. 5, the image of a character 44, 46 depicts symbol characters "#", and "@" which are displayed and indicate that the write symbol mode has been selected and the characters are to be entered as symbol characters or punctuation.

It will be appreciated that different characters than those illustrated in FIG. 2 through FIG. 5 can be displayed for each of the writing modes, and that when more than two writing boxes are provided, an equivalent number of characters being displayed is provided, the characters being displayed are preferably displayed a sequence of characters, such as "x", "y", "z" for three character boxes.

The plurality of buttons used to select the plurality of writing modes can be conventional "soft keys" displayed on the display, or can be conventional buttons, such as buttons 50, 52 and 54, disposed in an area of the housing adjacent the display 38.

Figure 6:
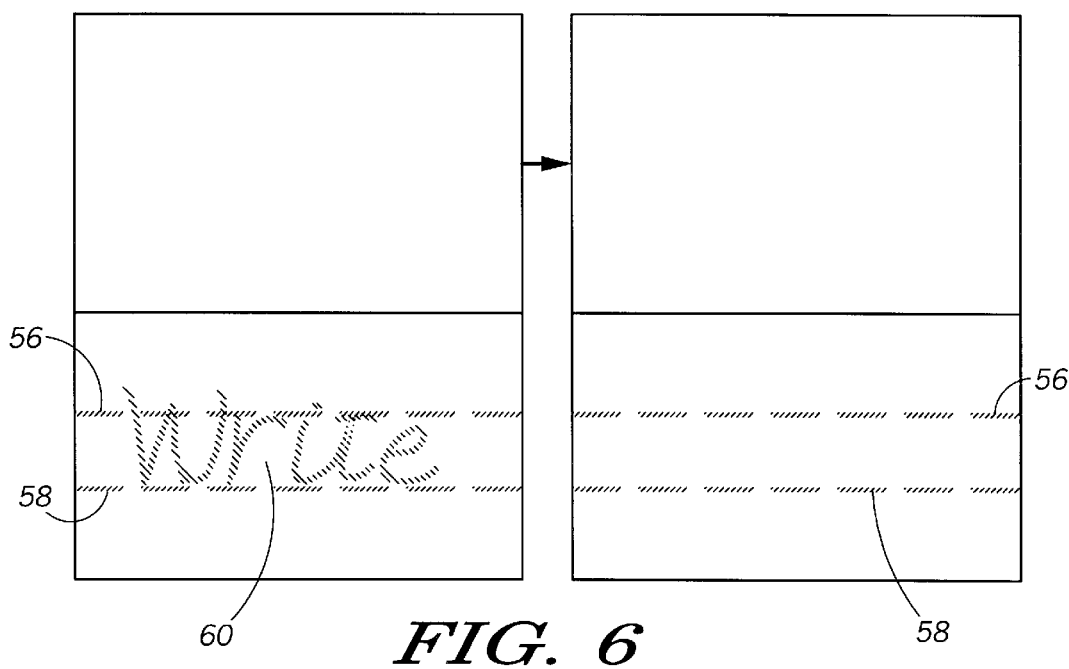
FIG. 6 is a diagram the operation of a handwriting recognition graphical user interface in accordance with an alternate embodiment of the present invention.

When the handwriting recognition software allows for writing more than one letter at a time, such as cursive writing, or other free handwriting styles, the shape of the watermarks are changed preferably to that shown in FIG. 6. In the example of FIG. 6, the watermarks are preferably two parallel dotted lines 56, 58 and the word 60 "Write". In the preferred embodiment of the present invention, the word 60 "Write" will disappear as soon as the pen/stylus touches the display surface. The dotted lines 56, 58 remain displayed on the display 38 to identify the area in which the cursive writing is to take place, and to indicate the relative size of upper case, or capitalized, letters and lower case letters, i.e. lower case letter being written between the doted lines 56, 58. The watermarks thus imply the user can write one word at a time, how large the word must be for best recognition, and that the user can write mixed case (uppercase and lowercase) letters.

The watermarks described above are preferably light gray text (or graphics) characters which are normally displayed as a background to a writing box. The watermarks do not take up the space or crowd the writing boxes and can serve as a very subtle visual hint to the user of the form by which characters are to be inputted. The watermarks are preferably produced when the image of a character is displayed on an LCD display using a low contrast ratio. The watermarks are also preferably displayed only when the user has switched modes, when first launching the handwriting recognition mode, or whenever a default character type is automatically selected, and after the first character is written (scripted), the watermarks will preferably disappear from the writing boxes 12. The watermarks described above are most effective when they appear in animation as shown in FIGS. 7 and 8. For instance, when the user launches the handwriting recognition application and the lower case write letters mode is selected, the watermark is printed (from left to right for roman languages) on the display as if they are being handwritten, that is, a lower case "a" is generated in the first writing box, followed by a lower case "b" in the second writing box. The animation process reinforces to the skilled user as well as the novice user the type of character to be inputted, where the character is to be inputted, and how large the character should be for optimum recognition.

FIG. 7 and FIG. 8 illustrate the animation of the character image which is displayed within the writing boxes. For purposes of illustration, a lower case "a" is displayed in animation within a first writing box 80, and a lower case "b" is displayed in animation within a second writing box 82. The animated character images 84 and 86 inform the user of which handwriting mode is currently selected, what is the preferred size of the characters to be entered, and the form of entry, i.e. a single character within each writing box.

Figure 9:
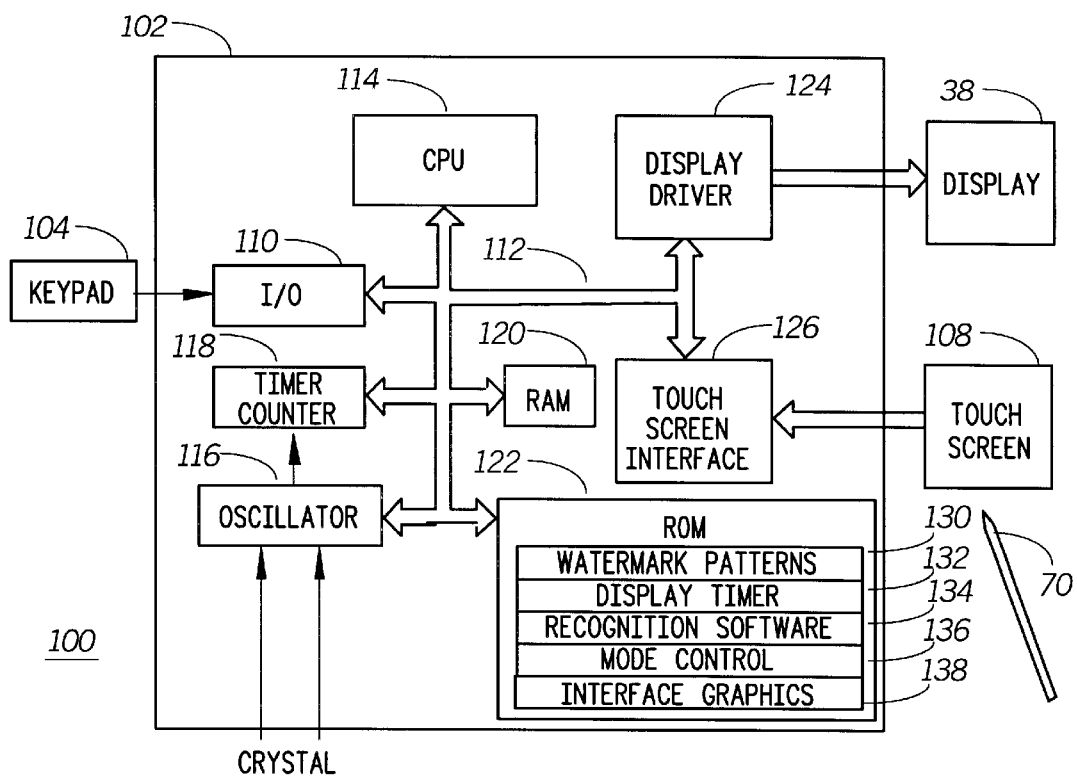
FIG. 9 is an electrical block diagram of an electronic device utilizing the handwriting recognition graphical user interface in accordance with the present invention.

FIG. 9 is an electrical block diagram of an electronic device 100 utilizing the handwriting recognition graphical user interface in accordance with the present invention. The electronic device 100 can be a personal digital assistant, a handheld computer, or other handheld device which provides handwriting recognition as a form of data input. The electronic device 100 includes a processor 102, such as an MC68HC05 microcomputer, manufactured by Motorola, Inc of Schaumburg, Ill., which controls the complete operation of the electronic device 10. It will be appreciated that any other microcomputer can be utilized as well. A conventional keypad 104, keyboard, or multiple individual buttons are used to control the electronic device 100 and to enter data into the electronic device 100. A display 38 is provided to display information which has been entered into the electronic device 100. A touch screen tablet 108, located preferably in a position in front of the display 38, is used to input information into the electronic device 100. Information is inputted into the electronic device 100 using a stylus 70.

A crystal, or crystal oscillator (not shown) is coupled to the inputs of an oscillator 116 which provides a reference signal for establishing the microcomputer timing. A timer/counter 118 couples to the oscillator 116 and provides programmable timing functions which are utilized in controlling the operation of the electronic device 100. The timer/counter function may also be performed in software, such as the display timer function 132. A RAM (random access memory) 120 is utilized to store variables derived during processing, as well as to provide storage of information which is inputted from the touch screen tablet 108. As the information is being inputted, it is also being displayed on display 38. A ROM (read only memory) 122 stores the applications which control the operation of the electronic device 100, as will be described in further detail below. It will be appreciated that in many microcomputer implementations, the ROM memory area can be provided by an EEPROM (electrically eraseable programmable read only memory). The oscillator 116, timer/counter 118, RAM 120 and ROM 122 couple through an address/data/control bus 112 to a central processing unit (CPU) 114 which performs the instructions and controls the operations of the electronic device 100. The ROM 122 includes various applications used to control the operation of the electronic device 100, including by way of example are the watermark patterns 130 used to alert the user of the mode of operation for handwriting analysis through animated character images. A display timer 132 controls the time the watermark is displayed. It will be appreciated that this function could also be performed by the timer/counter 118. Recognition software 134 is used to convert the handwritten characters into ASCII character data. Mode control software 136 enable the user to select which form of handwriting recognition is to be utilized and controls the generation of the watermarks. Interface graphics software provides the graphical user interface which is displayed on the display 38. The handwriting recognition applications described above can be provided on a plug in memory card or downloaded into the electronic device 100 using a serial port from a personal computer.

A display driver 124 interfaces between the display 38 and the CPU 114. A touch screen interface 126 interfaces between the touch screen tablet 108 and the CPU 114.

Figure 10:
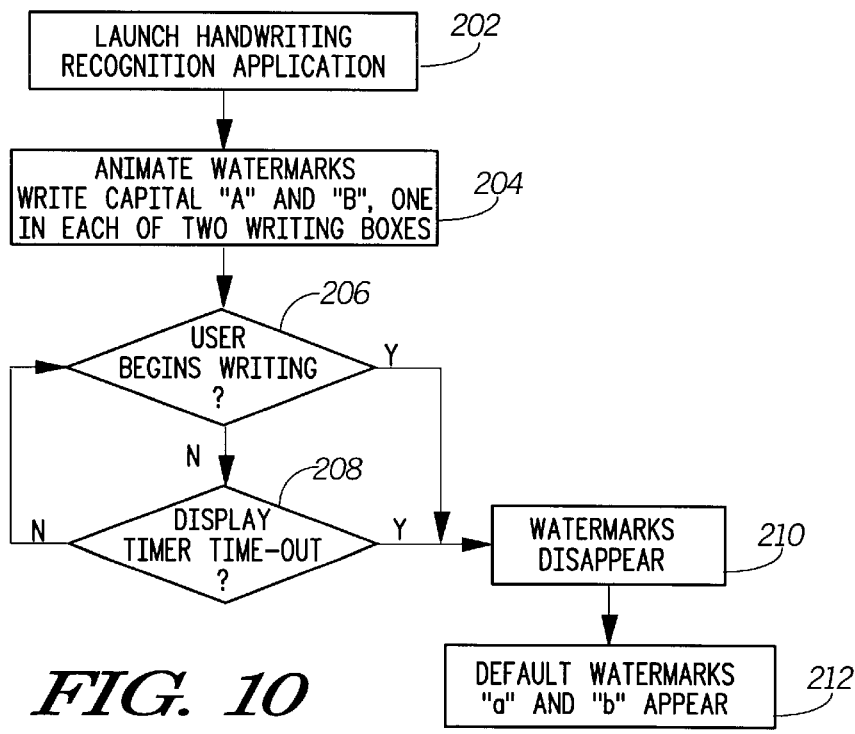
FIG. 10 through FIG. 15 are flow charts illustrating the operation of the handwriting recognition graphical user interface in accordance with the present invention.

FIGS. 10 through 15 are flow charts illustrating the operation of the handwriting recognition graphical user interface in accordance with the present invention. Referring to FIG. 10, when the handwriting recognition application 136 is launched at step 202, watermarks appear as animated character images. The default state of the watermarks depicts inputting lower case characters, and the watermarks are represented by character images of a lower case a and lower case b; however when the handwriting recognition application 136 is launched, the basic handwriting recognition software is intelligent and expects the first character inputted to be the first character of a sentence, and as a result inputted as a capital letter, thus animated character images are generated in which a capital A and capital B are written into each of the writing boxes 12. The capital letters A and B are written from left to right, one in writing box 80 and one in writing box 82, at step 204. At step 204, the software checks to see whether the user begins writing in one of the writing boxes. If the user does not begin writing, at step 206, the software checks to see whether a display timer has timed out, such as after a 1 second time period, a step 208, and continues to step 206 and step 208 until one or the other step occurs. When user writing is detected, at step 206, or the display timer has timed out, at step 208, the watermarks disappear in writing box 80 and writing box 82, at step 210. Upon completion of the writing of the first character, the default watermarks are displayed, at step 212, until either the user begins writing or the display timer times out, indicating to the user that the characters to follow should be inputted as lower case characters.

Figure 11:
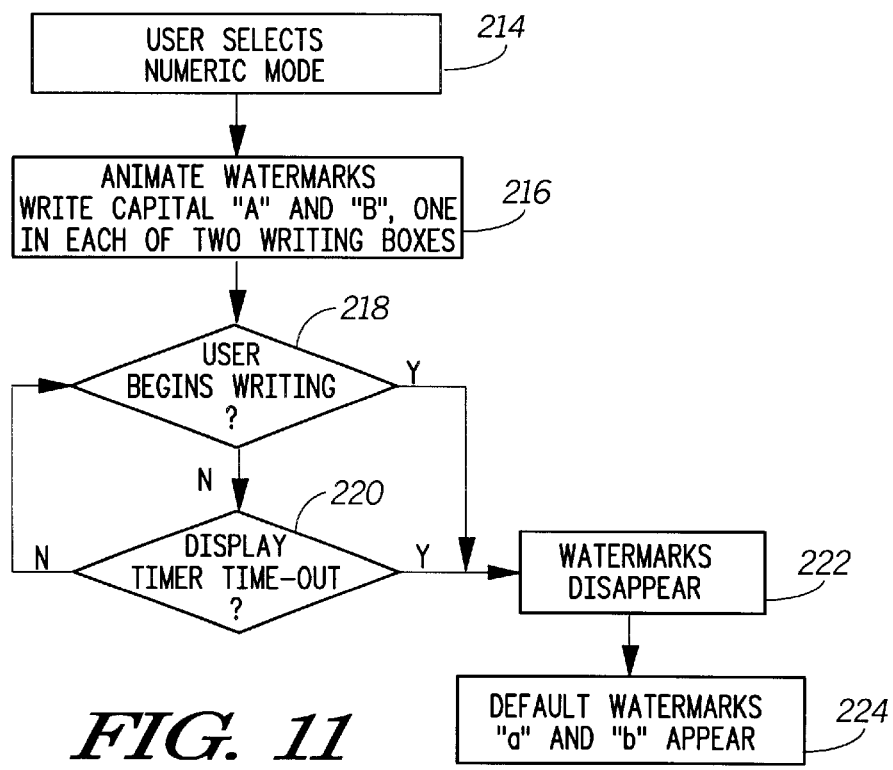

Referring to FIG. 11, when the user selects the shift mode by clicking switch 28, at step 214, watermarks appear as animated character images, and capital letters A and B are written from left to right, one in writing box 80 and one in writing box 82, at step 216. At step 218, the software checks to see whether the user begins writing in one of the writing boxes. If the user does not begin writing, at step 218, the software checks to see whether a display timer has timed out, such as after a 1 second time period, at step 220, and continues check at step 218 and 220, until one or the other step occurs. When user writing is detected, at step 218, or the display timer has timed out, at step 220, the watermarks disappear in writing box 80 and writing box 82, at step 222. Upon completion of the writing of the shifted character, the default watermarks are displayed, at step 224, until either the user begins writing or the display timer times out, indicating to the user that the characters to follow should be inputted as lower case characters.

Figure 12:
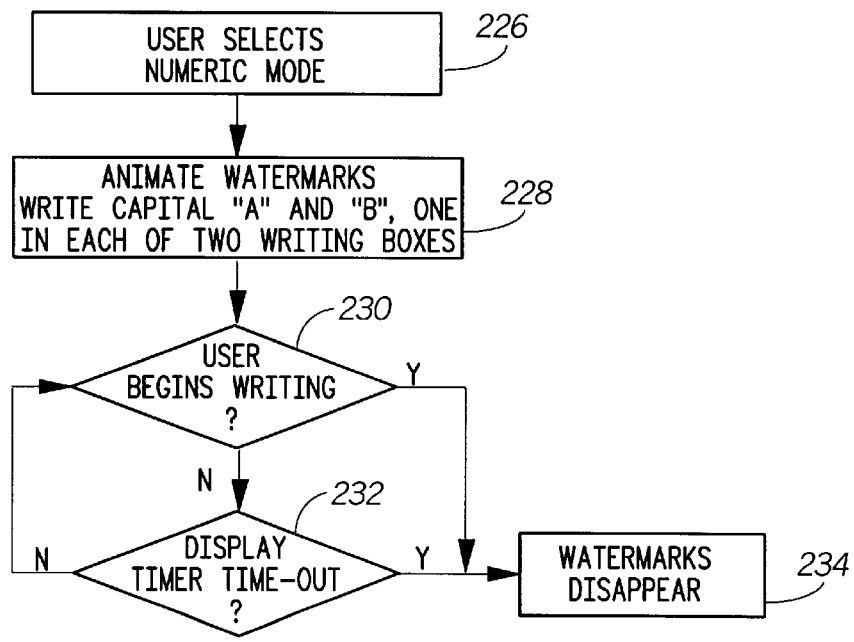

Referring to FIG. 12, when the user selects the caps mode by double clicking switch 20, at step 228, watermarks appear as animated character images, and capital letters A and B are written from left to right, one in writing box 80 and one in writing box 82, at step 228. At step 230, the software checks to see whether the user begins writing in one of the writing boxes. If the user does not begin writing, at step 230, the software checks to see whether a display timer has timed out, such as after a 1 second time period, at step 232, and continues check at step 230 and 232, until one or the other step occurs. When user writing is detected, at step 230, or the display timer has timed out, at step 232, the watermarks disappear in writing box 80 and writing box 82, at step 234. The user can continue to input capital letters until one of the other input modes is selected.

Figure 13:
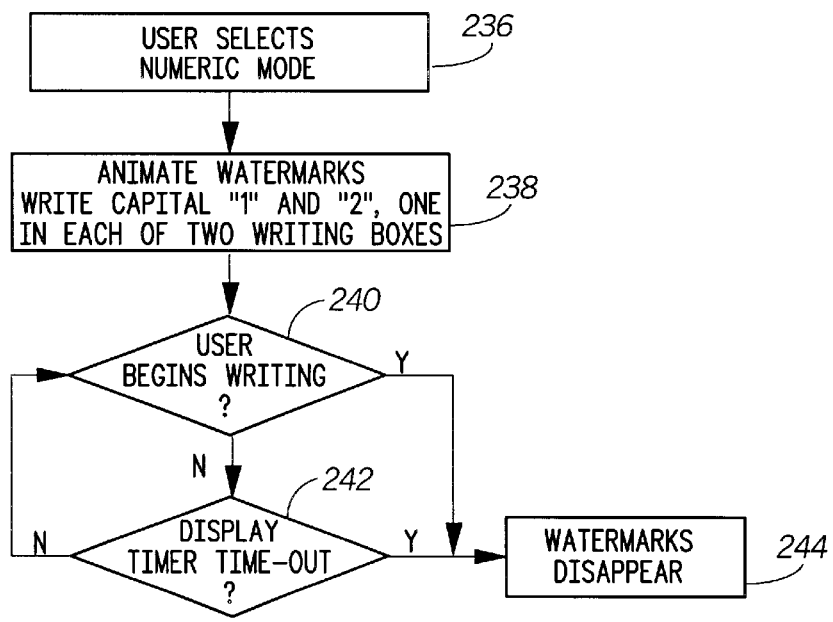

Referring to FIG. 13, when the user selects the numeric input mode by clicking switch 22, at step 236, watermarks appear as animated character images, and numerals 1 and 2 are written from left to right, one in writing box 80 and one in writing box 82, at step 238. At step 240, the software checks to see whether the user begins writing in one of the writing boxes. If the user does not begin writing, at step 240, the software checks to see whether a display timer has timed out, such as after a 1 second time period, at step 242, and continues check at step 240 and 242, until one or the other step occurs. When user writing is detected, at step 240, or the display timer has timed out, at step 242, the watermarks disappear in writing box 80 and writing box 82, at step 244. The user can continue to input numerals until one of the other input modes is selected.

Figure 14:
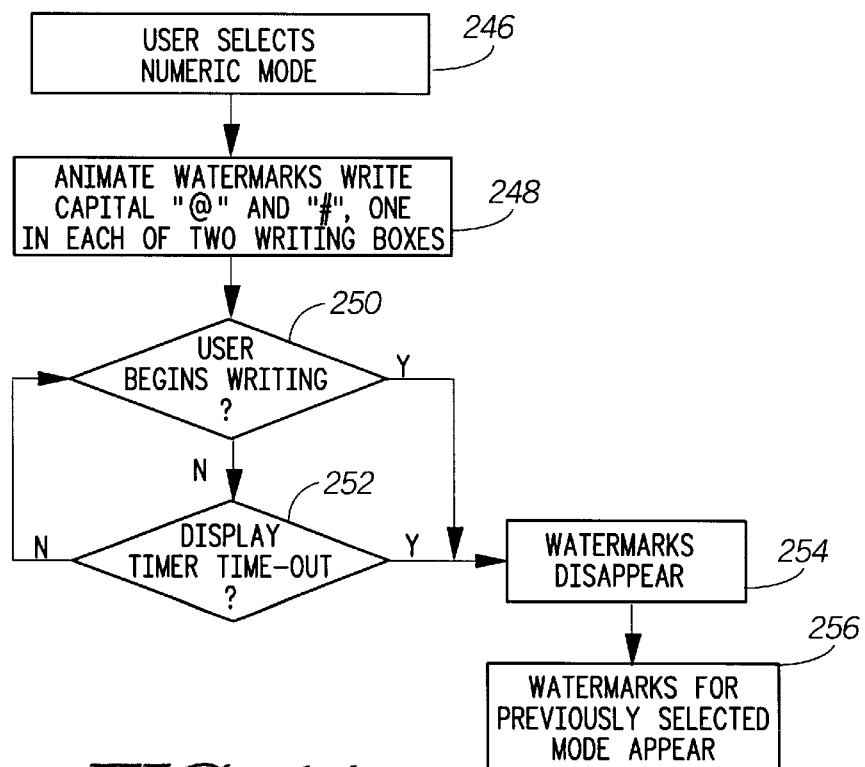

Referring to FIG. 14, when the user selects the symbol mode by clicking switch 24, at step 246, watermarks appear as animated character images, and symbols @ and # are written from left to right, one in writing box 80 and one in writing box 82, at step 248. At step 250, the software checks to see whether the user begins writing in one of the writing boxes. If the user does not begin writing, at step 250, the software checks to see whether a display timer has timed out, such as after a 1 second time period, at step 252, and continues check at step 250 and 252, until one or the other step occurs. When user writing is detected, at step 250, or the display timer has timed out, at step 252, the watermarks disappear in writing box 80 and writing box 82, at step 254. Upon completion of the writing of the symbols, the watermarks for the previously selected input mode are displayed, at step 256, until either the user begins writing or the display timer times out, indicating to the user that the characters to follow should be inputted as lower case characters.

Figure 15:
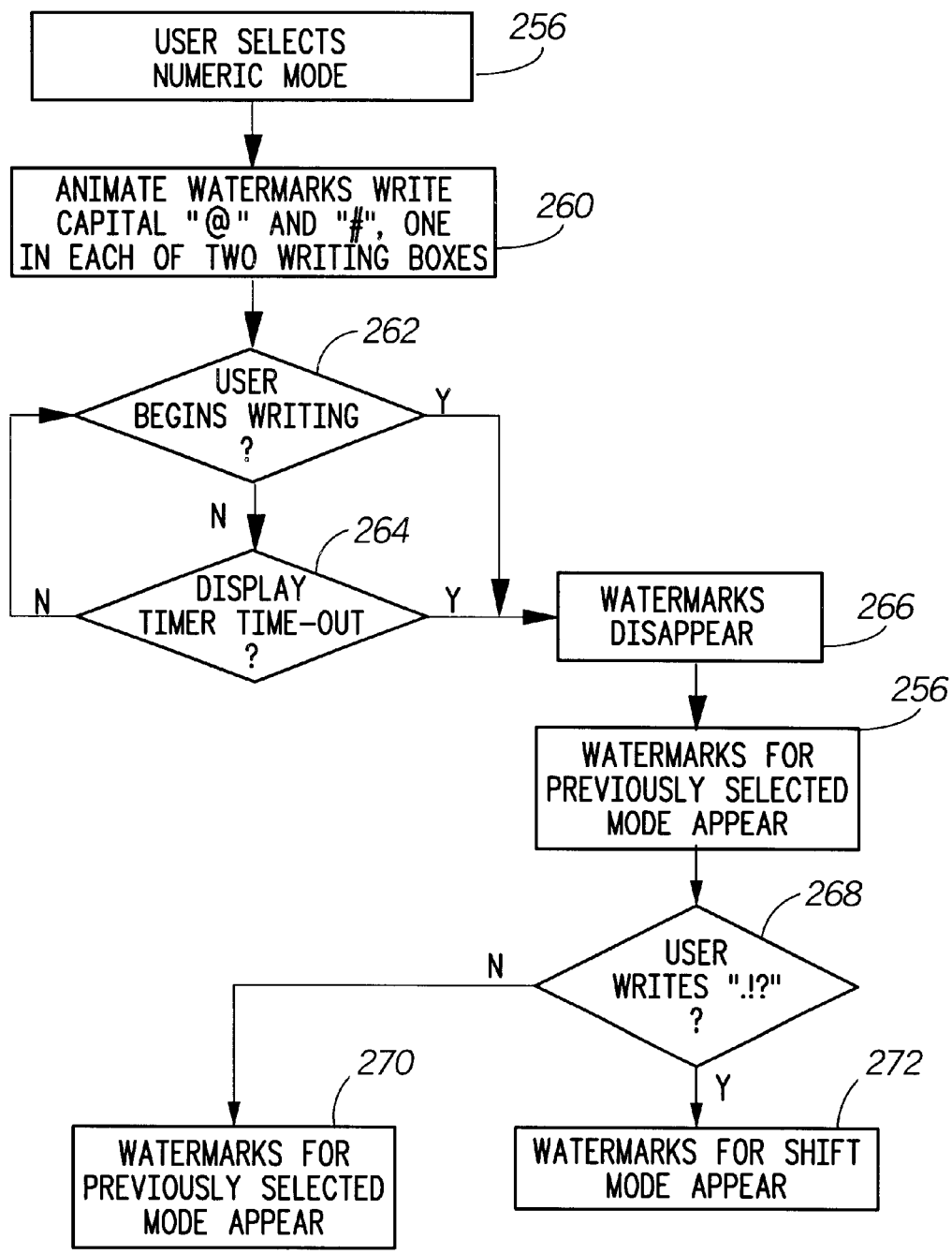

Referring to FIG. 15, when the user selects the punctuation input mode by clicking switch 24, at step 256, watermarks appear as animated character images, and symbols @ and # are written from left to right, one in writing box 80 and one in writing box 82, at step 260. At step 262, the software checks to see whether the user begins writing in one of the writing boxes. If the user does not begin writing, at step 262, the software checks to see whether a display timer has timed out, such as after a 1 second time period, at step 264, and continues check at step 262 and 264, until one or the other step occurs. When user writing is detected, at step 262, or the display timer has timed out, at step 264, the watermarks disappear in writing box 80 and writing box 82, at step 266. When the user has entered a punctuation character which symbolizes the end of a sentence, such as a period (.), an exclamation mark (!), or a question mark (?), watermarks for the shifted mode described in FIG. 11 appear, at step 272, otherwise watermarks for the previously selected input mode appear, at step 270.

In sunmmary, a graphical handwriting recognition user interface 40 has been described which includes a display 38, one or more areas 80, 82 designated on the display 38 for enabling entry of handwritten information using a stylus 70, and an image of a character 84, 86 which is displayed within the one or more areas 80, 82 designated for entering the handwritten information, the image of the character displayed depicts the form of the handwritten information to be entered. The graphical handwriting recognition user interface includes a plurality of buttons which provide for a selection of a plurality of writing modes, wherein the image of the character displayed depicts the form of the handwritten information to be entered for each of the plurality of writing modes. The image of the character is displayed on the display using a low contrast ratio, and is displayed in a manner which depicts the character being entered, thereby rendering animation to the image of the character being displayed. The image of the character is displayed for a predetermined period of time, such as a one second time interval, or until the user begins to input a character. The handwritten information can be inputted as cursive script or printed text which is inputted within the one or more designated areas as one character per designated area.

While specific embodiments of this invention have been shown and described, further modifications and improvements will occur to those skilled in the art. All modifications which retain the basic underlying principles disclosed and claimed herein are with the scope and spirit of the present invention.

I claim:

1. A graphical handwriting recognition user interface, comprising:
    a display;
    one or more areas designated on said display for enabling entry of handwritten information using a stylus; and
    an image of a character being displayed within said one or more areas designated for entering the handwritten information,
    said image depicting a form of the handwritten information to be entered before receiving the handwritten information at said one or more areas.

2. The graphical handwriting recognition user interface of claim 1, further comprising a plurality of buttons providing for a selection of a plurality of writing modes, wherein said image of a character displayed depicts the form of the handwritten information to be entered for each of the plurality of writing modes.

3. The graphical handwriting recognition user interface of claim 2, wherein said plurality of buttons are displayed on said display.

4. The graphical handwriting recognition user interface of claim 2, wherein said plurality of buttons are disposed adjacent said display.

5. The graphical handwriting recognition user interface according to claim 1, wherein said image of a character is displayed on said display using a low contrast ratio.

6. The graphical handwriting recognition user interface according to claim 1, wherein said image of a character is displayed on said display in a manner depicting the character being entered, thereby rendering animation to the image of a character being displayed.

7. The graphical handwriting recognition user interface of claim 1, wherein said image of a character is displayed for a predetermined period of time.

8. The graphical handwriting recognition user interface of claim 7, further comprising a timer for generating said predetermined period of time during which said image of a character is displayed.

9. The graphical handwriting recognition user interface according to claim 8, wherein said timer is a hardware timer.

10. The graphical handwriting recognition user interface according to claim 8, wherein said timer is a software timer.

11. The graphical handwriting recognition user interface according to claim 7, wherein said predetermined period of time is for an time interval of one second.

12. The graphical handwriting recognition user interface of claim 1, wherein said image of a character is displayed until the user begins to input a character.

13. The graphical handwriting recognition user interface according to claim 1, wherein said handwritten information is cursive script.

14. The graphical handwriting recognition user interface according to claim 1, wherein said handwritten information is printed text.

15. The graphical handwriting recognition user interface of claim 1 wherein said one or more areas designated for entering handwritten information provide for the entry of a single character.

16. The graphical handwriting recognition user interface of claim 1 wherein said one or more areas designated for entering handwritten information provide for the entry of a single word.

17. The graphical handwriting recognition user interface of claim 16 further comprising
    an image of a word being displayed within said one or more areas designated for entering the handwritten information,
    said image depicting a form of the handwritten information to be entered.

18. The graphical handwriting recognition user interface according to claim 17, wherein said image of a word is displayed on said display using a low contrast ratio.

19. The graphical handwriting recognition user interface according to claim 17, wherein said image of a word is displayed on said display in a manner depicting the word being entered using said stylus, thereby rendering animation to the image of the word being displayed.

* * * * *